United States Patent Office

3,790,690
Patented Feb. 5, 1974

3,790,690
PROCESS FOR THE PRODUCTION OF CORTICATED OAT KERNELS AND OAT FLAKES
Hans-Joachim F. G. Fritze, Riedener Weg. 44A,
Starnberg, Germany
No Drawing. Filed Dec. 27, 1971, Ser. No. 212,768
Int. Cl. A23l 1/10
U.S. Cl. 426—457                                         11 Claims

ABSTRACT OF THE DISCLOSURE

Oat kernals and oat flakes are produced by cleaning the oats and then wetting with water and storing in a wood silo for 24–72 hours until the moisture content is brought to 17–21% practically evenly distributed throughout the entire kernels and the kernels begin to germinate. Thereafter the oats are hulled, cleaned and kiln-dried at a temperature of not more than 65° C. to a desired moisture content.

---

Oat kernels and oat flakes are produced by cleaning products such as oat flakes and similar nutritional preparations. Oat food products are not only especially well suited as breakfast foods, but are also especially well suited for the nutrition of children and sick persons. Oat porridge and oat gruel have an excellent dietetic effect in the case of disorders of the digestive system.

To utilize to the greatest degree possible this favorable dietetic effect, the oat kernel used for the production of food products should be left in the natural state if possible, i.e. for example, the capability of the kernel to germinate should remain intact and all nutritional contents as well as vitamins should be retained in their natural condition, especially the saponin content. Moreover, an improvement in taste is desired for certain purposes, for example, in the case of oat flakes. In conjunction with this problem, as few kernels as possible should be broken during the production operation, since broken kernels lead to bitter and rancid oat products in a short time.

In current operations for the production of, for example, oat flakes and decorticated oat kernels used as the intermediate product, the oats are steamed and kiln-dried which leads to a denaturation thereof, to disintegration of the nutrient content and vitamins as well as to a loss of the capability of the kernel to germinate.

The conventional process at present can be described as follows:

The oats are subjected to a silo cleaning, thereafter possibly being transported to intermediate storage; the oats are then subjected to another cleaning operation mill cleaning, then graded according to grain size and then the oats pass through trieures. The oats are then clipped and thereafter decorticated and are then conducted to a vertical airsifter and gravity separators, then followed by centrifugal dust separation, are then transported to the trieures and then paddy tables and finally to the mantle brush machine. This operation is then followed by steaming, i.e. moisturizing by steam and heat for up to 5 minutes at a temperature of at least 100° C., most of the time however at much higher temperatures. After steaming, the oats are then dried in a kiln for about 2 hours at 90° C. and the dried kernels are then transported through the flaking roller mill if oat kernels are to be produced; in many cases, they are previously cut in a drum cutter.

Flavor is imparted to the oat kernel material such that the oat kernel material coming out of production with approximately 11 to 12% moisture content is subjected to a steaming operation at at least 100° C. This steaming operation imparts a certain amount of moisture to the oat kernel material, however in the case of a steaming time of approximately 1 to 5 minutes, only the marginal zones of the material can take up the moisture. Due to its nature, the subsequent drying process likewise affects only the marginal zones which have taken up moisture, i.e. can only produce flavoring in the marginal zones.

The oat flakes obtained in this manner are considerably denatured by the steaming and also by the drying process. The oat kernel material, as employed for the production of oat flakes according to this known mode of operation, is also kiln-dried for the purpose of maintaining storability, since such an oat kernel produced by the conventional method of production is not durable and does not keep during storage without this drying treatment and will turn bitter and rancid.

As opposed to this known process and according to the present invention, an oat kernel material capable of germination and left in its natural state is prepared such that all natural nutrient contents and vitamins are retained in the oat kernel as well as in the oat flakes produced therefrom. In so doing, the valuable dietetic properties of the natural grain are retained. The kernel can be stored and is durable for an unlimited interval of time, even after decortication and the oat flakes produced therefrom have a remarkably better taste than those produced according to the known method.

The process according to this invention for the production of decorticated oat kernels capable of germination and having good keeping qualities and of oat flakes made therefrom comprises: subjecting the oats to a silo and mill cleaning, transporting through trieures, wetting with water and immediately bringing the oats into a silo where they remain until the moisture content amounts to 17–21% throughout the entire kernel, then decorticating the kernels in the conventional manner in a centrifugal dehusking machine, then conducting the oats through a vertical airsifter and gravity separator as well as through a centrifugal dust separator and through trieures and finally to the paddy tables. The oat kernels then proceed to the mantle brush machine and are then kiln-dried at a temperature of not more than 65° C., preferably 60° C., without supplying steam. The oat kernel prepared in this way can then either be stored and/or transported as long as desired, or directly supplied to the flaking mill to produce oat flakes.

According to a modification of this process the oat kernels after hulling are passed through a rolling mill and in doing so the kernels are pressed with pressure that is higher than the pressure normally used in preparing oat flakes. The flakes produced in this manner are then kiln-dried to a desired moisture content. By this kiln-drying the desired special nut taste is developed. Using this process the kiln-drying may be accomplished at somewhat higher temperatures of the flake.

The above modifications may further be modified by passing the oat kernels through a cutter for cutting before being passed through the rolling mill.

The natural nutrient contents and vitamins of the oat kernel are in no way damaged by the entire moisturizing operation or the careful kiln-drying operation. The thoroughly moisturized oat kernel acquires throughout its entirety the nut flavor desired for food products, especially for oat flakes, to a surprising degree even though there is no steaming.

The oat kernels preserved in this way can be stored, for practical purposes, for an unlimited length of time and do not turn bitter or rancid so that oat flakes do not have to be produced immediately after the preceding work steps.

It is essential that the grain and the kernels are thoroughly moisturized. In accordance with a preferred and special modification hereof, the moisturized oat grain and the kernel are allowed to grow biologically until germination begins. This yields a product having an especially full-grade nutritional value. During this process of growth, the husk is not yet detached, but has started to open. The resultant specific degree of elasticity and softness is of particular advantage for further processing as well. The time interval necessary for the beginning of germination varies according to the origin of the oats, but normally amounts to 24–72 hours, especially 36–60 hours.

The time necessary to the beginning of germination can easily be determined for a particular batch of oats by actual experiments keeping some small batches in a wet atmosphere in a wooden box for different time periods and cutting the kernels to see whether they are thoroughly moistened and whether growth of the germ has begun. For a specific variety of oats coming from a certain region and having a specific moisture content, there are only slight variations in time of treatment required.

It is known to decoraticate oats wherein the oats are moistened to cause the grain and kernels to swell and thereafter removing the hulls from said kernels by conventional means. There is no real growth in prior processes but only an accumulation of water between husk and kernel. There is no indication, however, that it is essential instead of merely swelling the oats to maintain the oats in a wet atmosphere until the growth of the germ or spore begins and to avoid hot water or steam and the addition of chemicals to the water to achieve the production of a product in its natural state with its full nutritive value.

In striking contrast to the known methods, any treatment with hot water or steam is avoided in the present process and, furthermore, kiln-drying is also carried out at an unusually low temperature, i.e. not more than 65° C., preferably not more than 60° C. This means a temperature at which there is no denaturation.

In comparison with known processes for producing oat flakes or oat products, no classification as to grain size is necessary; in addition, the oats are not to be clipped either.

For reasons of expediency, the oat grains are allowed to grow in a wooden silo since tests have proven that concrete or metal silos can have an undesirable effect on the growth process and on the end product.

The following example explains the practical execution of the process:

Ten tons of raw oats (U.S. No. 2, approximately 12% by weight of moisture) are subjected to a conventional silo cleaning by means of a swing sieve. The oats are then conducted through trieures in parallel, each having an output of 3 tons per hour where the remaining seeds and foreign matter are removed. The oats are then wetted with a conventional wetting apparatus having a wetting screw to achieve the desired moisture content and are then deposited directly from the screw into wooden silos having a capacity of 10 to 25 tons. The oats remain in the silo until germination begins, approximately 48 to 54 hours in the present case.

The oats are then removed and are conducted via an elevator to a number of strato mills having an hourly output of approximately 1.2 tons (MIAG) for the decortication process. A production capacity of 6 tons per hour can be maintained if five strato mills are employed. After decoratication, the material is fed into vertical airsifters, gravity separators and centrifugal dust separators to separate kernel, hull and other material and then proceeds to the paddy table for separation of the nondecorticated kernels. Preferably, a trieur is provided prior to the paddy table. The oats then proceed into a mantle brush machine to remove the germ-hairs which adhere to the oats.

The effective yield can be checked at this point and shows that yields of at least 70% are obtained at normal operating conditions as opposed to approximately 65% using the known methods.

The kernels which have moisture contents of 17–20% here, are then fed into a kiln apparatus (type MIAG) having a kiln-drying effect where they are dried to a moisture content of 11 to 12% at a temperature of about 60° C. During this operation, the taste is at the same time improved, the oats taking on a distinct and pleasant nut taste.

The dried oat kernels obtained in this manner are then led to a roller mill conventional for oat flake production. If desired, the kernels may be passed through a cutter for cutting before rolling.

The process can be carried out continuously or interruptedly according to the silo and machine capacities utilized. It must be noted that the moisture content established in the silo should remain constant until decoratication. The residence time in the silo is determined by the beginning of germination. The oats should not be transported pneumatically from the beginning of the wetting operation until after the decoratication operation is completed so that the moisture content is not changed too greatly.

The oat kernels which are produced in this process are clean, undamaged and have a moisture content of at least 16% by weight. About 1% by weight of its moisture content could get lost during the husking. They may be dried or kiln-dried to any desired moisture content either before or after processing to oat flakes.

It will be obvious to those skilled in the art that various changes may be made without departing from the scope of the invention and the invention is not to be considered limited to what is described in the specification.

What is claimed is:

1. A process for producing storable oat kernels free of their husks and capable of germination, comprising cleaning the oats for the removal of seeds and foreign matter, wetting the oats with pure cold water and immediately thereafter bringing the oats into a silo for a time of about 24–72 hours and sufficient to bring the moisture content distributed throughout the entire kernel to 17–21% by weight, thereafter dehusking the oats, separating the dehusked kernels from the husks and other material, cleaning the kernels and kiln-drying the kernels at a temperature of not more than 65° C. to a desired moisture content.

2. A process in accordance with claim 1 wherein the oats are maintained in the silo until the beginning of germination of the oats.

3. A process according to claim 2 wherein the oats are maintained in the silo for a period of between 36 and 60 hours.

4. A process according to claim 1 where the temperature of kiln-drying is not more than 60° C.

5. A process for producing oat flakes with the full nutritive value of natural oats comprising all the steps of claim 1 followed by rolling the kernels obtained.

6. A process according to claim 5 wherein the drying temperature is not more than 60° C.

7. A process according to claim 5 wherein growth of the kernel is conducted in a wood silo until the kernel begins to germinate.

8. A process according to claim 5 wherein the oats are maintained in the silo until the beginning of germination of the oats.

9. A process according to claim 8 wherein the oats are maintained in the silo for a period of between 36 and 60 hours.

10. A process for producing oat flakes with the full nutritive value of natural oats comprising cleaning the oats for the removal of seeds and foreign matter, wetting the oats with pure cold water and immediately thereafter bringing the oats into a silo for a time of about 24–72 hours and sufficient to bring the moisture content distributed throughout the entire kernel to 17–21% by weight, thereafter dehusking the oats, separating the kernels from the husks and other material, cleaning the kernels, passing the oats through a rolling mill wherein the oats are pressed with a higher than normal pressure and then kiln-drying the flakes to a desired moisture content to develop a desired nut taste.

11. A process according to claim 10 wherein the oat kernels are passed through a cutter for cutting before being passed through the rolling mill.

References Cited

UNITED STATES PATENTS

| 677,789 | 7/1901 | Nagel | 99—80 R |
| 1,034,169 | 7/1912 | Valentine | 99—80 R |
| 3,640,728 | 2/1972 | Ronai et al. | 99—80 R |
| 929,481 | 7/1909 | Paul | 99—80 R |

RAYMOND N. JONES, Primary Examiner

U.S. Cl. X.R.

426—482

UNITED STATES PATENT OFFICE
CERTIFICATE OF CORRECTION

Patent No. 3,790,690    Dated February 5, 1974

Inventor(s) Hans-Joachim FRITZE

It is certified that error appears in the above-identified patent and that said Letters Patent are hereby corrected as shown below:

Col. 1, line 11, delete "kernals" and insert therefore --kernels--;

Col. 1, line 21, delete in its entirety and insert therefore --Oats are predominantly used for the production of food--;

Signed and sealed this 6th day of August 1974.

(SEAL)
Attest:

McCOY M. GIBSON, JR.
Attesting Officer

C. MARSHALL DANN
Commissioner of Patents